No. 734,325. Patented July 21, 1903.

UNITED STATES PATENT OFFICE.

OTTO HESS, OF HÖCHST-ON-THE-MAIN, GERMANY, ASSIGNOR TO FARB-WERKE, VORM. MEISTER, LUCIUS & BRÜNING, OF HÖCHST-ON-THE-MAIN, GERMANY, A CORPORATION OF GERMANY.

GREEN ANTHRAQUINONE DYE AND PROCESS OF MAKING SAME.

SPECIFICATION forming part of Letters Patent No. 734,325, dated July 21, 1903.

Application filed April 18, 1903. Serial No. 153,206. (No specimens.)

*To all whom it may concern:*

Be it known that I, OTTO HESS, Ph. D., a citizen of the Empire of Germany, residing at Höchst-on-the-Main, Germany, have invented certain new and useful Improvements in the Manufacture of a Green Anthraquinone Dyestuff, of which the following is a specification.

My invention consists in the manufacture of new dyestuff-sulfonic acids of the anthraquinone series which may be obtained by the action of sulfonating agents on dialphylamidodioxyanthraquinones. The latter are obtained by heating leuco-tetraoxyanthraquinones with primary aromatic amins—such as anilin, para-toluidin, xylidin, and alpha-naphthylamin and the like—in presence of salts of these amins. Leuco-tetraoxyanthraquinone is obtained by energetic acid reduction of para-dinitrodioxyanthraquinones.

When dry, the new dyestuff-sulfonic acids are green powders, soluble in water with a green color, which on addition of caustic alkalies turns to blue-green. The dyestuffs dye unmordanted wool green, the dyeings on chrome-mordanted wool being of a still more yellowish tint.

The manufacture of dialphylamidodioxy-anthraquinones is illustrated as follows: One part by weight of leuco-tetraoxyanthraquinone and the same quantity of para-toluidin hydrochlorid are introduced into seven parts of molten para-toluidin, and the melt is heated for several hours to 90° to 110° centigrade until no unchanged leuco-tetraoxyanthraquinone is left. The mass is treated with two parts of pyridin, cooled, and filtered. The new body remains on the filter as dark crystals. They are soluble with great difficulty in indifferent solvents with a green color. With caustic alkalies they yield crystallized salts, being also insoluble in hot anilin, pyridin, or chloroform.

To transform the condensation product into the dyestuff-sulfonic acid, one part, by weight, of it is dissolved in ten parts of sulfuric acid of 66° Baumé, and the solution is heated to 60° to 70° centigrade until a test portion completely dissolves in water. The cold mixture of sulfonation is then poured into seventy parts of a solution of common salt, whereupon the dyestuff separates in green flakes. They are filtered, washed with a solution of common salt, and dried. The sodium salt of the new dyestuff-sulfonic acid thus obtained is a green powder soluble in water with a green and in diluted caustic-soda lye with a blue color. The calcium salt is nearly insoluble in water. The new dyestuff dyes unmordanted wool green and wool mordanted with chromium compounds yellow-green. The dialphylamidodioxyanthraquinones obtained from anilin, xylidin, and naphthylamin or other primary aromatic amins are transformed in a similar manner into dyestuff-sulfonic acids.

Having now described my invention, what I claim is—

1. The herein-described process for the manufacture of new anthraquinone dyestuffs which consists in treating dialphylamidodioxyanthraquinones with sulfonating agents and in isolating the sulfonic acids from the mixture of reaction in the manner herein described, substantially as set forth.

2. The herein-described process for the manufacture of a new anthraquinone dyestuff which consists in treating di-para-toluidodioxyanthraquinone with sulfonating agents and in separating the dyestuff obtained soluble in water in the manner herein described, substantially as set forth.

3. The herein-described new anthraquinone dyestuffs, being when dry green powders soluble in water with a green, in concentrated caustic-soda lye with a blue-green color, dyeing unmordanted wool in green and wool mordanted with chromium compounds in yellow-green shades.

4. The herein-described new anthraquinone dyestuff obtained by sulfonating the di-para-toluidodioxyanthraquinone, being soluble in water with a green, in diluted caustic-soda lye with a blue color and dyeing unmordanted wool green and wool mordanted with chromium compounds yellow-green shades.

In testimony that I claim the foregoing as my invention I have signed my name in presence of two subscribing witnesses.

OTTO HESS.

Witnesses:
ALFRED BRISBOIS,
BERNHARD LYDECKER.